United States Patent
Chen et al.

(10) Patent No.: US 6,513,093 B1
(45) Date of Patent: Jan. 28, 2003

(54) HIGH RELIABILITY, HIGH PERFORMANCE DISK ARRAY STORAGE SYSTEM

(75) Inventors: Ying Chen, San Jose, CA (US); Edward Gustav Chron, Sunnyvale, CA (US); Windsor Wee Sun Hsu, Sunnyvale, CA (US); Stephen Paul Morgan, San Jose, CA (US); Honesty Cheng Young, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/372,297

(22) Filed: Aug. 11, 1999

(51) Int. Cl.[7] .............................. G06F 12/00; H02H 3/05
(52) U.S. Cl. ................................................ 711/4; 714/6
(58) Field of Search ................................. 711/114, 202, 711/155, 216, 221, 170, 165, 4; 710/66, 1; 714/2, 6

(56) References Cited

U.S. PATENT DOCUMENTS

| | | | |
|---|---|---|---|
| 5,249,279 A | 9/1993 | Schmenk et al. ........... 395/425 |
| 5,301,297 A | 4/1994 | Menon et al. .............. 395/425 |
| 5,386,402 A | 1/1995 | Iwata ........................ 369/32 |
| 5,392,244 A | * 2/1995 | Jacobson .................... 365/200 |
| 5,416,915 A | 5/1995 | Mattson et al. ............. 395/425 |
| 5,423,046 A | 6/1995 | Nunnelley et al. .......... 395/750 |
| 5,497,457 A | 3/1996 | Ford ....................... 395/182.04 |
| 5,522,032 A | 5/1996 | Franaszek et al. ...... 395/182.04 |
| 5,524,204 A | 6/1996 | Verdoorn, Jr. .......... 395/182.04 |
| 5,524,205 A | 6/1996 | Lomet et al. ........... 395/182.14 |
| 5,530,850 A | 6/1996 | Ford et al. .................. 395/600 |
| 5,537,588 A | 7/1996 | Engelmann et al. ........ 395/600 |
| 5,551,003 A | 8/1996 | Mattson et al. ............. 395/463 |
| 5,557,770 A | 9/1996 | Bhide et al. ................ 395/488 |
| 5,568,629 A | 10/1996 | Gentry et al. .............. 395/441 |
| 5,574,952 A | 11/1996 | Brady et al. ................ 395/888 |
| 5,592,648 A | 1/1997 | Schultz et al. ............. 395/441 |
| 5,613,085 A | 3/1997 | Lee et al. ................... 395/441 |

(List continued on next page.)

OTHER PUBLICATIONS

Publication: "Data Handling for Failed Hard Disk Drive in Redundant Array of Inexpensive Disks Subsystem." IBM Technical Disclosure Bulletin. vol. 40, No. 02, pp. 223–225. Feb. 1997.
Publication: "Reducing Data Movement in Log Structure File System Garbage Collection." IBM Technical Disclosure Bulletin. vol. 38, No. 02, pp. 323–325. Feb. 1995.

Primary Examiner—Do Hyun Yoo
Assistant Examiner—Kimberly McLean
(74) Attorney, Agent, or Firm—John L. Rogitz

(57) ABSTRACT

A system for ensuring high reliability in a block service disk array system while promoting high performance by logically writing all changes to strides on the array while physically writing ahead to a log only a subset of the changes. Specifically, for changes of only a strip or so, the changes are written to a log, along with a commit record, and then written to disk, later deleting the changes from the log. In contrast, for relatively larger changes, i.e., for an entire (or nearly entire) stride, the old stride is not overwritten by the new, but rather is written to a new location on the disk, with the new and old locations and a commit record (but not the new stride itself) being logged and with the entries for the locations in the stride mapping table swapped with each other. In an alternate embodiment, blocks can be written to temporary locations in a RAID-1 area and lazily moved to home locations in a RAID-5 area of an array of disks.

31 Claims, 7 Drawing Sheets

BLOCKS 1-1-1 = STRIPE
BLOCKS 1-1-1 2-2-2 = STRIDE
ON DISK #1, BLOCKS 1-2 = STRIP

*SYSTEM*

U.S. PATENT DOCUMENTS

| | | | |
|---|---|---|---|
| 5,625,820 A | 4/1997 | Hermsmeier et al. | 395/618 |
| 5,657,468 A | 8/1997 | Stallmo et al. | 395/441 |
| 5,659,677 A | 8/1997 | Cohn et al. | 395/182.04 |
| 5,659,704 A | 8/1997 | Burkes et al. | 395/441 |
| 5,666,511 A | 9/1997 | Suganuma et al. | 711/114 |
| 5,666,512 A * | 9/1997 | Nelson | 711/114 |
| 5,708,668 A | 1/1998 | Styczinski | 371/40.1 |
| 5,708,793 A | 1/1998 | Franaszek et al. | 395/439 |
| 5,734,861 A | 3/1998 | Cohn et al. | 395/461 |
| 5,754,756 A | 5/1998 | Watanabe et al. | 395/182.04 |
| 5,790,774 A | 8/1998 | Sarkozy | 395/182.04 |
| 5,799,324 A | 8/1998 | McNutt et al. | 707/206 |
| 5,802,344 A | 9/1998 | Menon et al. | 395/492 |
| 5,805,788 A | 9/1998 | Johnson | 395/182.04 |
| 5,812,753 A | 9/1998 | Chiariotti | 395/182.04 |
| 5,832,508 A | 11/1998 | Sherman et al. | 707/200 |
| 5,835,694 A | 11/1998 | Hodges | 395/182.04 |
| 5,860,090 A * | 1/1999 | Clark | 711/113 |
| 5,875,456 A | 2/1999 | Stallmo et al. | 711/114 |
| 5,960,451 A * | 9/1999 | Voigt | 711/114 |
| 6,021,408 A * | 2/2000 | Ledain et al. | 707/8 |
| 6,151,641 A * | 11/2000 | Herbert | 710/22 |
| 6,182,198 B1 * | 1/2001 | Hubis et al. | 711/162 |
| 6,219,751 B1 * | 4/2001 | Hodges | 711/114 |
| 6,219,800 B1 * | 4/2001 | Johnson | 714/5 |
| 6,230,240 B1 * | 5/2001 | Shrader | 711/114 |
| 6,282,671 B1 * | 8/2001 | Islam | 714/6 |

* cited by examiner

BLOCKS 1-1-1 = STRIPE
BLOCKS 1-1-1
       2-2-2 = STRIDE

ON DISK #1, BLOCKS 1-2 = STRIP

SYSTEM

OVERVIEW OF SOFTWARE ARCHITECTURE

SINGLE STRIP UPDATE LOGIC

COMPLETE STRIDE
UPDATE LOGIC

PARTIAL STRIDE UPDATE -
NON-WORST CASE

PARTIAL STRIDE UPDATE,
WORST CASE

IN-LINE WRITES

IN-LINE READS

COLLAPSE

RECOVERY

HIGH RELIABILITY, HIGH PERFORMANCE DISK ARRAY STORAGE SYSTEM

BACKGROUND OF THE INVENTION

1. Field of the Invention

The present invention relates generally to block service storage disk arrays, and more particularly to systems and methods for promoting the reliability and performance of block service computer storage disk arrays.

2. Description of the Related Art

Disk array systems such as reliable arrays of independent disks (RAID) are used to reliably store data by essentially spreading the data over plural disk drives operating in concert. When the below-mentioned technique known as "parity" is used among the data stored on the disks, one disk drive can malfunction but the data temporally lost thereby can nevertheless be recovered.

The following discussion, particularly related to a first embodiment of the present invention, illuminates how disk arrays promote reliability and data recoverability. When data is written to the array, it is not written to a single drive in the array. Instead, the data is "striped" across the array. During manufacturing, each drive is divided (in logic) into sequentially numbered blocks, and when the drives are configured into an array, blocks of the drives having the same logical numbers comprise a "stripe". A mathematical operation referred to as "XOR" is performed on the blocks of a stripe to yield a parity strip. Should one of the drives subsequently malfunction, each lost strip of data can be recovered by executing an XOR operation on the remaining data blocks of its stripe, along with the parity strip that had been derived from the stripe, to thereby recover the lost data. In addition to the above consideration of reliability, striping data across the drives of a disk drive array can enhance performance by promoting efficient and rapid data access.

As recognized by the present invention, prior art array systems address reliability concerns either by requiring external user applications to act to ensure reliability, or by entering changes to data in special-purpose, high-performance persistent storage, in addition to physically making the changes. Requiring user applications to undertake the reliability function is onerous on the applications, while entering (in persistent storage) all data to be written, as well as physically writing the data to disk, is duplicative. In other words, as recognized herein, maintaining duplicate records of the data—one logically, and one physically—requires the presence of persistent storage, and can degrade performance.

Database systems that store data on disks address the reliability issue by inserting flags in the data as it is stored. This is possible for database systems to do, because database systems typically format the data to be stored in accordance with their own internal formatting protocol. In the event of a subsequent malfunction, the flags can be used to ensure internal data consistency and integrity.

On the other hand, in the case of a block service, to which the present invention is directed, it is impractical to insert such flags in the data. This is because a block service typically does not reformat data received from, e.g., an operating system for storage. Rather, a block service stores the data as received from the operating system, which generally assumes that the block service will store data in 512 byte sectors. Consequently, were database-like flags to be used by a block service, an entire new sector would be required to store the flags, resulting in wasted space and degraded performance attributable to increased input/output (I/O) operations. Fortunately, the present invention recognizes that it is possible to minimize recording data to improve performance while ensuring data recoverability in the event that one drive of an array malfunctions in a block service device.

With further respect to current RAID systems as considered by a second embodiment of the invention, a so-called RAID 1 storage is designed to efficiently execute small writes to the storage medium, whereas a so-called RAID 5 storage is designed with reliability and efficient execution of large reads and Writes in mind. In RAID-1 storage, also referred to as "mirror set" storage, two identical copies of data are maintained on a disk array, whereas in RAID-5 storage, also referred to as "strip set with parity", data is striped across the disks of an array as described above.

The present invention recognizes, however, that it is not sufficient or trivial to simply combine RAID 1 principles with RAID 5 principles in a single system, without also accounting for heretofore unrecognized hurdles in doing so. For example, in the "Autoraid" system marketed by Hewlett-Packard, elements of RAID-1 storage are combined with elements of RAID-5 storage, but because writes to the RAID-5 storage is undertaken using log-structured write principles to promote efficiency, the writes are always relatively large and are always appended to the end of a log. Unfortunately, as recognized herein, this requires significant post-processing (colloquially referred to as "garbage collection") and can also destroy the data layout semantics, resulting in degraded performance during subsequent reads. The present invention understands these drawbacks and provides the solutions below.

SUMMARY OF THE INVENTION

The invention is a general purpose computer programmed according to the inventive steps herein to update a block service disk array with new data, reliably and with high performance. "Reliability" includes fault tolerance. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

Accordingly, a general purpose computer includes at least one memory and at least one computer usable medium that has computer usable code means for storing data on a data storage device having an old data set stored thereon. As disclosed further below, the computer usable code means includes computer readable code means for receiving an update of at least a portion of the old data set. Also, computer readable code means modify, in memory, the old data set using the update, to render a modification. Moreover, computer readable code means write at least a commit record of the modification to a log, and computer readable code means write at least a portion of the modification to the data storage device.

In a first preferred embodiment, the data storage device is used as a block service, and it includes at least one disk array on which data is stored in strides. The strides establish respective data sets, with each stride defining plural strips. Also, the portion of the old data is at least one old strip and the update is at least one new strip, and computer readable code means generate at least one delta parity strip using the old strip and an old parity strip. Furthermore, computer readable code means generate a new parity strip using the delta parity strip and the modification.

In one implementation of the first preferred embodiment, the means for writing the commit record to the log also writes the modification and the new parity strip to the log. Further, the new parity strip and modification are written to the data storage device, with the modification being written to the physical location of the old data set. The parity strips and the modification can be discarded from memory after the parity strips and the modification have been written to the data storage device.

In a second implementation of the first preferred embodiment, the modification is written to a new physical location on the data storage device that is different from the physical location of the old data set. As intended herein, the new physical location is determined using a stride mapping table. In this implementation, the portion of the old data includes plural old strips of a stride, the update is established by plural new strips, and the computer further includes computer readable code means for generating at least one new parity strip using the new strips. The address of the new physical location and the address of the physical location of the old data set are written to the log, without writing the modification and the new parity strip to the log. The entries for the old and new locations in the stride mapping table are exchanged for each other. If desired, the addresses of the physical locations can be discarded from the log after the modification has been written to the data storage device.

In another aspect, for a block service disk array across which data is arranged in strides, with each stride defining a respective strip on a respective disk of the array, a computer-implemented method includes logically writing all stride changes while physically writing ahead to a log only a subset of the changes.

In still another aspect, a computer program device includes a computer program storage device that is readable by a digital processing apparatus. A program means is on the program storage device, and the program includes instructions that can be executed by the digital processing apparatus for performing method acts for storing data on a data storage device. The method acts embodied in the program include receiving an update of at least a portion of an existing stride of data stored on a block service disk array. Also, the method acts embodied by the program include generating a parity data element based at least in part on the update, and determining whether to write just the update to disk or to write a modified version of the entire stride to disk. Still further, the method acts include, if the modified version of the entire stride is to be written to disk, determining a new location to which the modified version of the stride is to be written, it being understood that the new location is different from an old location at which the existing (unmodified) stride is stored. A commit record of the modification is written to a log along with at least the new location, when the modified version of the entire stride is to be or has been written to disk, and otherwise a commit record of the modification is written to a log along with at least the update, when just the update is to be written to disk.

With particular regard to a second embodiment of the present invention, a data storage system includes at least one disk array, at least one RAID-5 area on the disk array for holding data, and at least one RAID-1 area on the disk array. The RAID-5 area defines home locations for data blocks and the RAID-1 area defines temporary locations for data blocks. At least one map is in memory to correlate data blocks having home locations to temporary locations.

Preferably, the system also includes logic means for receiving an in-line write request to write first blocks to disk, and logic means for determining whether prior versions of the first blocks are in temporary locations in the RAID-1 area. If so, the temporary locations are overwritten with the first blocks. Otherwise, it is determined whether sufficient storage space exists in the RAID-1 area to hold the first blocks. If there is, the first blocks are written to the RAID-1 area, and otherwise are written to the RAID-5 area. The temporary locations to which the first blocks are written are recorded in an in-memory map. Also, logic means append map information to a log on the disk array in response to the updating. The preferred map is a hash table.

When the system is idle, logic means move blocks in the RAID-1 area to their home locations in the RAID-5 area. Further, logic means checkpoint the log in response to the means for moving. and logic means retrieve home locations and temporary locations from the log between the end of the log and the latest checkpoint after a controller crash. Block mappings to RAID-1 temporary locations are inserted into a reconstituted map in response to the means for retrieving.

In another aspect, a computer-implemented method for storing data includes receiving a request for a write to disk of first blocks, and, when previous versions of the blocks are in a temporary storage area on disk, overwriting the previous versions in response to the receiving act. Otherwise, the method determines whether sufficient storage space exists in the temporary area to hold the first blocks, and if so, the first blocks are written to the temporary area. If not, the blocks are written to a home area on disk.

In yet another aspect, a computer program product includes a computer program storage device including computer instructions to cause a computer to undertake method acts for storing data. The method acts embodied by the instructions include writing first blocks to a RAID-1 area on a disk array when sufficient storage space exists in the RAID-1 area or when previous versions of the blocks are present in the RAID-1 area, and otherwise writing the first blocks to a RAID-5 area on the disk. Blocks in the RAID-1 area are periodically moved to home locations in the RAID-5 area.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a flow chart of the overall logic for updating a block service disk array system when a change is received, in accordance with a first embodiment;

DETAILED DESCRIPTION OF THE PREFERRED EMBODIMENTS

Figure 1:
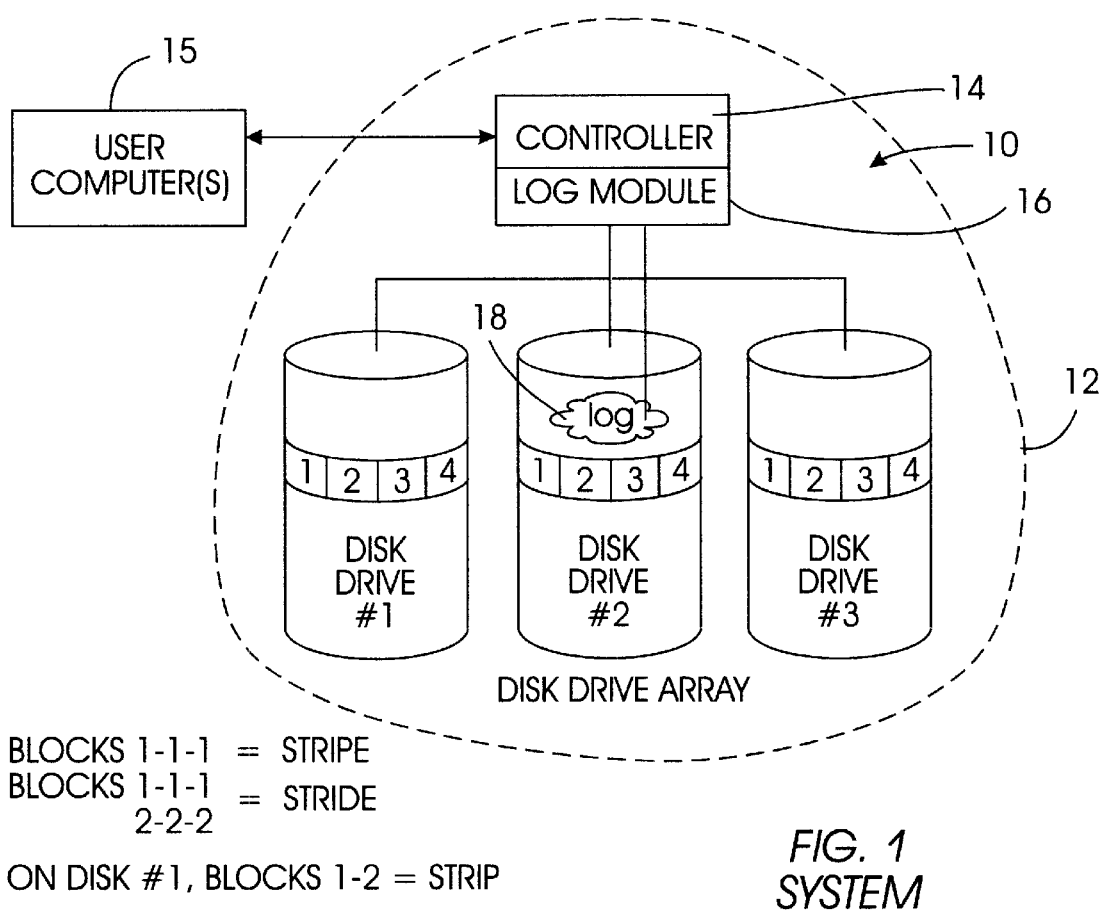
FIG. 1 is a schematic diagram of the present system.

Referring initially to FIG. 1, a system is shown, generally designated 10, for making changes to a block service disk drive array 12, also referred to herein as a "disk array". In the particular architecture shown, the system 10 includes a digital processing apparatus, such as a controller 14. The controller 14 can communicate with a computer 15. In one intended embodiment. either one or both of the controller 14 and computer 15 may be a personal computer made by International Business Machines Corporation (IBM) of Armonk, N.Y. as shown, or any computer, including computers sold under trademarks such as AS400, with accompanying IBM Network Stations. Or, the controller 14 and/or computer 15 may be a Unix computer, or OS/2 server, or Windows NT server, or IBM RS/6000 250 workstation with 128 MB of main memory running AIX 3.2.5., or an IBM laptop computer, or other suitable digital processing apparatus. In any case, the controller 14 receives read and write requests from the computer 15 for data stored on the disk array 12.

Figure 2:
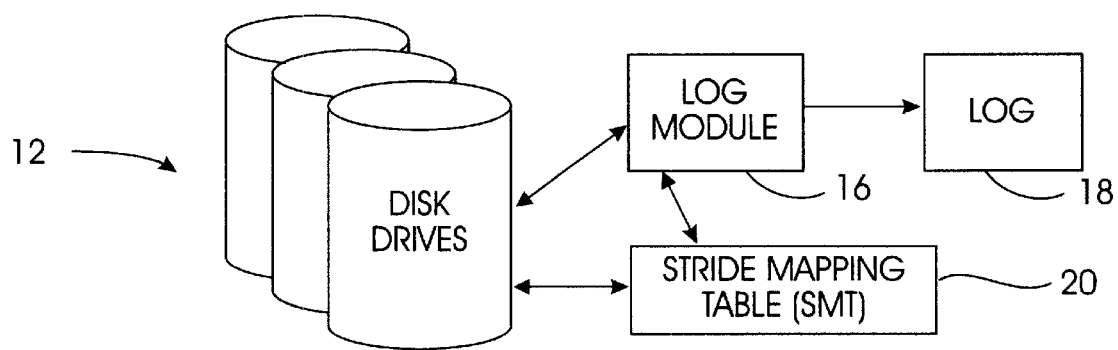
FIG. 2 is a block diagram of a first software architecture.

In cross-reference to FIGS. 1 and 2, the controller 14 includes a log module 16 which may be executed by a processor within the controller 14 as a series of computer-executable instructions to make and delete entries in a log 18. The log 18 is generated by the logic described below to list, among other things, serialized commit records when data modifications have been undertaken at least logically, prior to physically writing the modifications to disk. In this way, if a disk drive of the array 12 malfunctions at a time after transaction $t_i$ and before transaction $t_{i-1}$, the present logic knows that all transactions up to and including transaction $t_i$ have been completed, and none of the transactions from transaction $t_{i+1}$ onward have been completed. Accordingly, the log 18 can be applied to the disk drive array 12 to copy images of all transactions from $t_{i-1}$ onward to corresponding in-memory images (if any) and on-disk images to bring the array 12 to a consistent state, after which new transactions may be executed. In this way, the log 18 that is generated by the present logic ensures data reliability in the presence of a disk drive failure.

As also shown in FIG. 2, the log module communicates with a stripe mapping table 20, which lists the physical addresses of data "strides". The instructions embodied by the log module 14, along with the log 18, may reside, for example, in non-volatile RAM of the controller 14.

Alternatively, the instructions and/or log 18 may be contained on a data storage device with a computer readable medium, such as a computer diskette. Or, the instructions may, be stored on a DASD array, magnetic tape, conventional hard disk drive including one or more of the drives in the array 12 (indeed, FIG. 1 shows the log 18 so stored), electronic read-only memory, optical storage device, or other appropriate data storage device. In an illustrative embodiment of the invention, the computer-executable instructions may be lines of compiled $C^{++}$ compatible code.

It is to be understood that the system 10 can include peripheral computer equipment known in the art, including an output device such as a video monitor and an input device such as a computer keyboard, not show for clarity of disclosure. Other output devices can be used, such as printers. other computers, and so on. Likewise, input devices other than a keyboard can be used, e.g., a mouse, or trackballs, keypads, touch screens, and voice recognition devices.

As shown in continued cross-reference to FIGS. 1 and 2, the disk array 12 is a block service array, with data stored on the array 12 by "striping" the data across the disk drives of the array. Taking the schematic shown in FIG. 1 as an example, a first portion of data might be recorded on logically-numbered 512 byte sectors "1" of disk drives numbered 1–3 of the array 12 in accordance with data striping principles known in the art, it being understood that the present principles apply equally to arrays having fewer or greater than three disk drives. Likewise, a second portion of data might be striped across the logically-numbered sectors "2", with a third portion of data being striped across the logically-numbered sectors "3". In accordance with block service array principles, the array 12 might define a "stride" to encompass two such stripings; consequently, the logically-numbered "1" sectors of all three disk drives 1–3 plus the logically-numbered "2" sectors of all three disk drives 1–3 would establish a single stride. Adjacent same-stride sectors on a single disk establish a "strip"; thus, the logically numbered sectors "1" and "2" on the first disk drive 1 establish a first strip, the logically numbered sectors "1" and "2" on the second disk drive 2 establish a second strip, and so on.

With the above terminology in mind, reference is now made to FIG. 3. Commencing at state 21, the logic receives a request to write data to the disk array 12 to modify an existing stride of data. At decision diamond 22, the logic determines whether an update of only a single strip has been requested, and if so the logic invokes the logic of FIG. 4 at state 24. Otherwise, the logic proceeds to decision diamond 26 to determine whether an entire stride is to be updated, and if so the logic moves to state 28 to invoke the logic of FIG. 5.

When neither a single strip only nor an entire stride are to be updated, the logic proceeds to decision diamond 32 to determine whether a multiple strip partial stride update has been requested, in a non-worst case scenario. In a non-worst case scenario, the present invention moves to state 32 to invoke the logic of FIG. 6, which is similar to the logic of FIG. 4 (one strip only update), whereas in a worst-case scenario, the present invention moves to state 34 to invoke the logic of FIG. 7, which is similar to the logic of FIG. 5 (full stride update).

In accordance with present principles, the decision at diamond 30 whether to "promote" a multi-strip update to a full stride update (i.e., to use the logic of FIG. 7) depends on the availability and performance of system resources. For example, for nominal disk drive performance with the log 18 being maintained on disk, a three-strip update (assuming for illustration purposes that the array 12 includes five drives plus a parity drive, or "five plus P"), the test at decision diamond 30 would be negative, meaning the logic of FIG. 7 would be used. This is because, as understood herein, a sequential write to the disk-stored log 18 is likely to perform worse than the parallel write of a new stride under these circumstances. On the other hand, if the log 18 were maintained on very fast storage, e.g., non-volatile RAM or solid state disk, such an update would not be "promoted" to a full stride update, meaning that the logic of FIG. 6 would be used.

Figure 4:
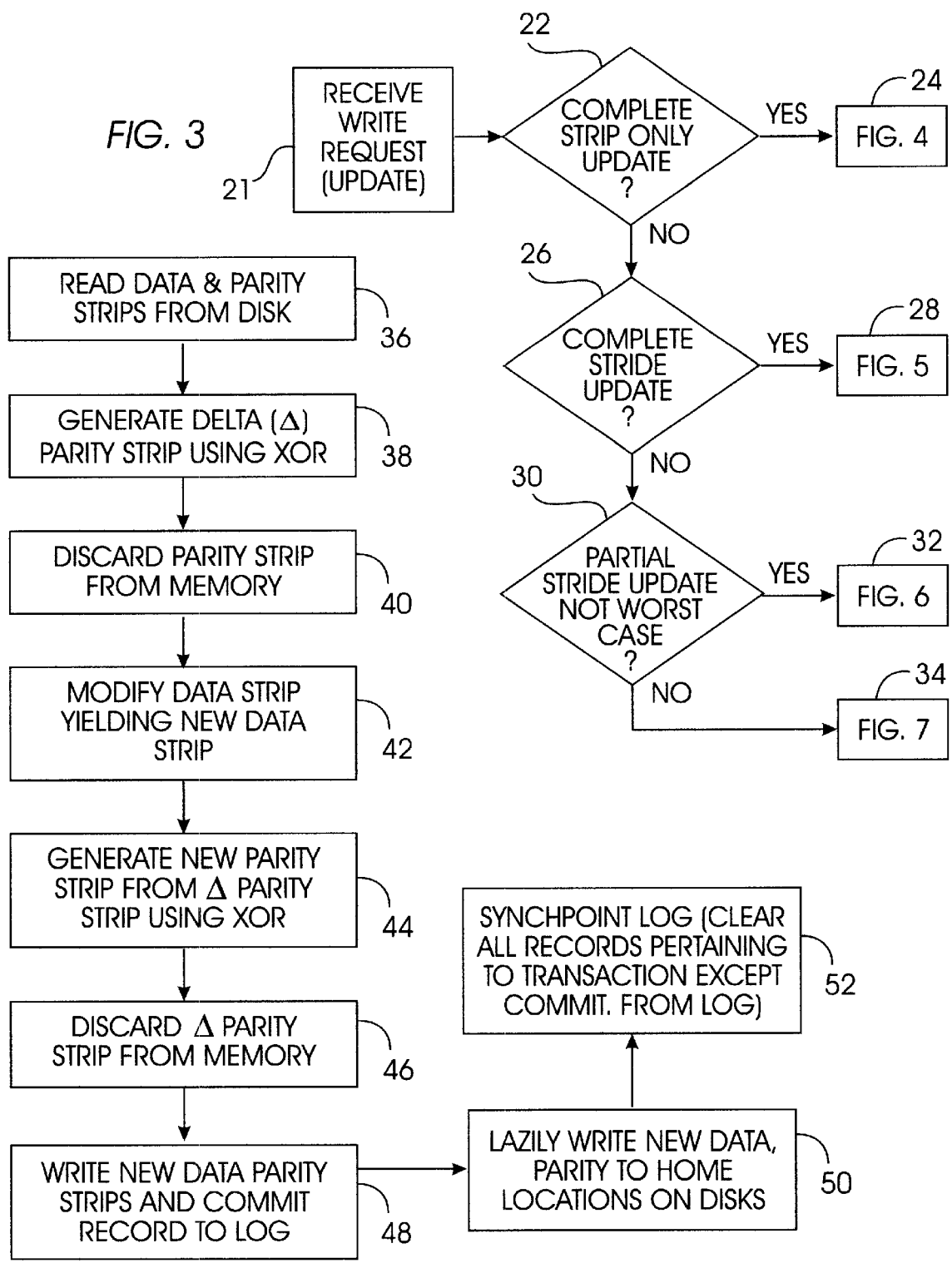
FIG. 4 is a flow chart of the logic undertaken when only a single strip of a stride is changed.

Now referring to FIG. 4, the logic for a single strip update can be seen. Commencing at state 36, the existing data and parity strips of the stride to be updated are read from disk. It is to be understood that a stride is one example of a data set that can be updated using the present invention.

In accordance with principles known in the art, a parity strip is generated using a logical operator on the data (non-parity) strips of the stride, such that subsequently, if one of the data strips is lost, it can be recovered by again using the logical operator on the parity strip and the remaining data strips. In the preferred embodiment, the logical operator is the XOR operator.

Moving to state 38, a delta parity strip is generated, preferably using the XOR operator. In accordance with the present invention, the delta parity strip is generated by XORing the data strips and parity strip that were read at state 36. Proceeding to state 40, the old parity strip is discarded from memory, and then at state 42 the data strip to be modified is modified in memory with the update received at state 21 in FIG. 3 to render a new strip, which can be thought of as a modification.

Having updated the data strip in memory, the logic moves to state 44 to generate a new parity strip by XORing the delta parity strip and the new data strip. At state 46, the delta parity strip is discarded from memory, and then at state 48 the new data strip and new parity strip are written to the log 18. Also, a commit record is written to the log 18. The commit record indicates that a new data strip has been generated based on the update received at state 21 in FIG. 2, and that the new strip itself is available in memory.

Once the commit record, new parity strip, and new data strip have been written to the log 18, the logic lazily writes the new data and parity strips to the disk array 12 at state 50. By "lazily" is meant that the write operation occurs on a non-expedited basis as system 10 resources permit. In the case considered by the logic of FIG. 4, when only a single data strip is updated, the write operation executed at state 50 can be an overwrite of the old data strip's physical location, in contrast to the logic about to be addressed in reference to FIG. 5, to optimize performance under these conditions by minimizing I/O. Concluding the logic of FIG. 4 at state 52, the log 18 is lazily "synchpointed", i.e., all records pertaining to the transaction just completed except the commit record are cleared from the log 18.

Figure 5:
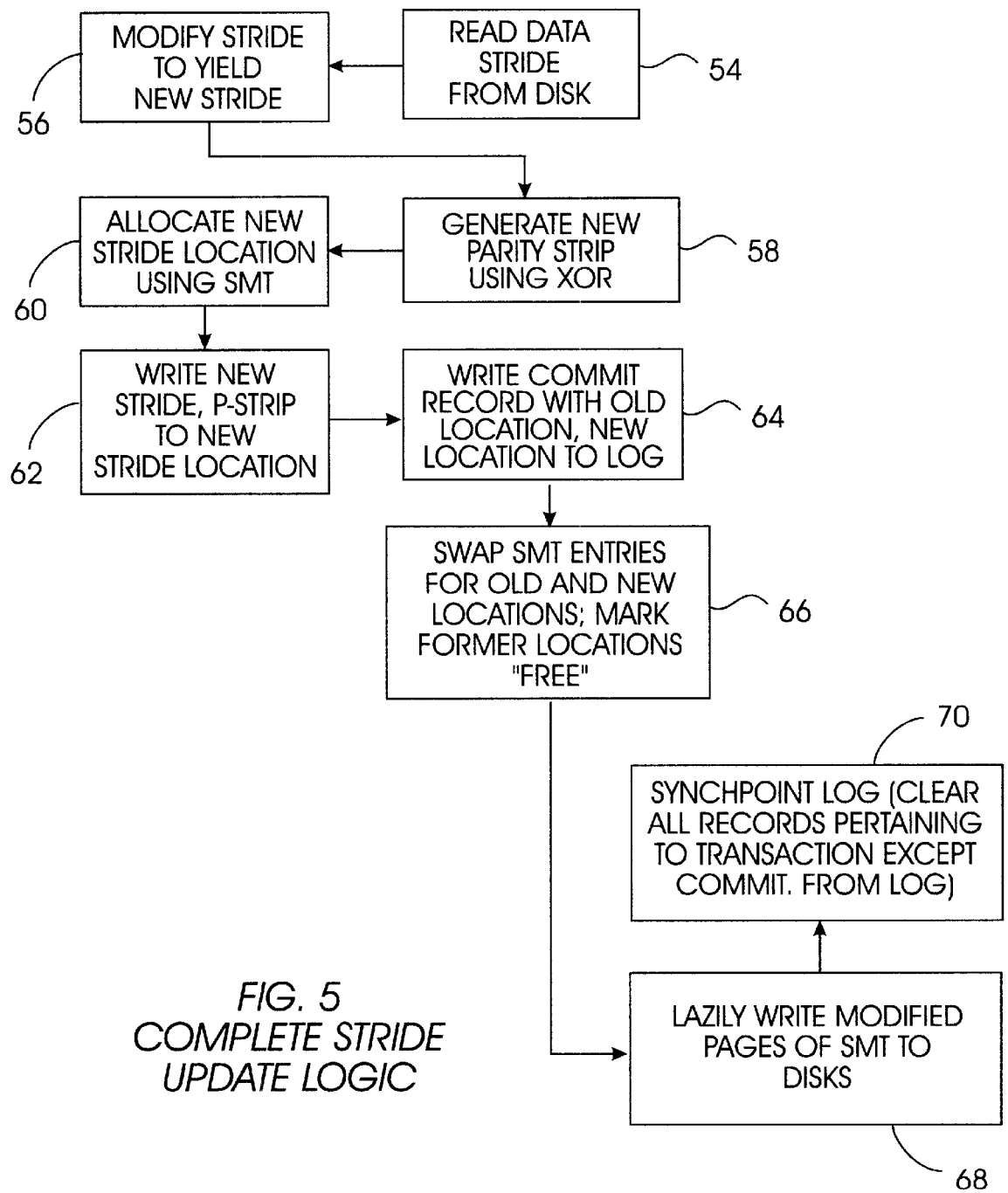
FIG. 5 is a flow chart of the logic undertaken when an entire stride is changed.

FIG. 5 shows the logic that is undertaken when an entire stride is to be updated. Commencing at state 54, the stride to be updated is read from disk, and at state 56 the stride is updated in memory using the update received at state 21 of FIG. 3. Proceeding to state 58 a new parity strip is generated by XORing the strips of the modified (new) stride.

As envisioned by the present invention, to optimize performance for an entire stride update while ensuring reliability in the presence of a disk drive failure, the logic moves to state 60 to access the stride mapping table (SMT) 20 (FIG. 2) to allocate a new physical location for the new stride. The new physical location is a previously unallocated portion of the disk array 12. Then, moving to state 62, the new stride and parity strip are written to the new physical location on the array 12.

Proceeding to state 64, a commit record of the modification, along with the addresses of the old stride physical location and new stride physical location, are written to the log 18. Thus, the entire new stride is not written to the log 18, but only the addresses of the old and new locations (along with the commit record of the transaction). Continuing with the present inventive logic, the process moves to state 66 to exchange entries in the SMT 20 for the old and new physical locations. The entry for the formerly old location is then indicated as being "free" in the SMT 20. Thus, in the logic shown in FIG. 5, no overwrite of the old data stride is undertaken; rather, the new stride is written to an unallocated portion of the array 12, the entries for the two locations swapped, and the formerly old location freed for future use. In this way, reliability is achieved, while optimizing performance. The logic of FIG. 5 concludes by lazily writing the modified page(s) of the SMT 20 to the array 12 at state 68, and then lazily synchpointing the log 18 at state 70.

Figure 6:
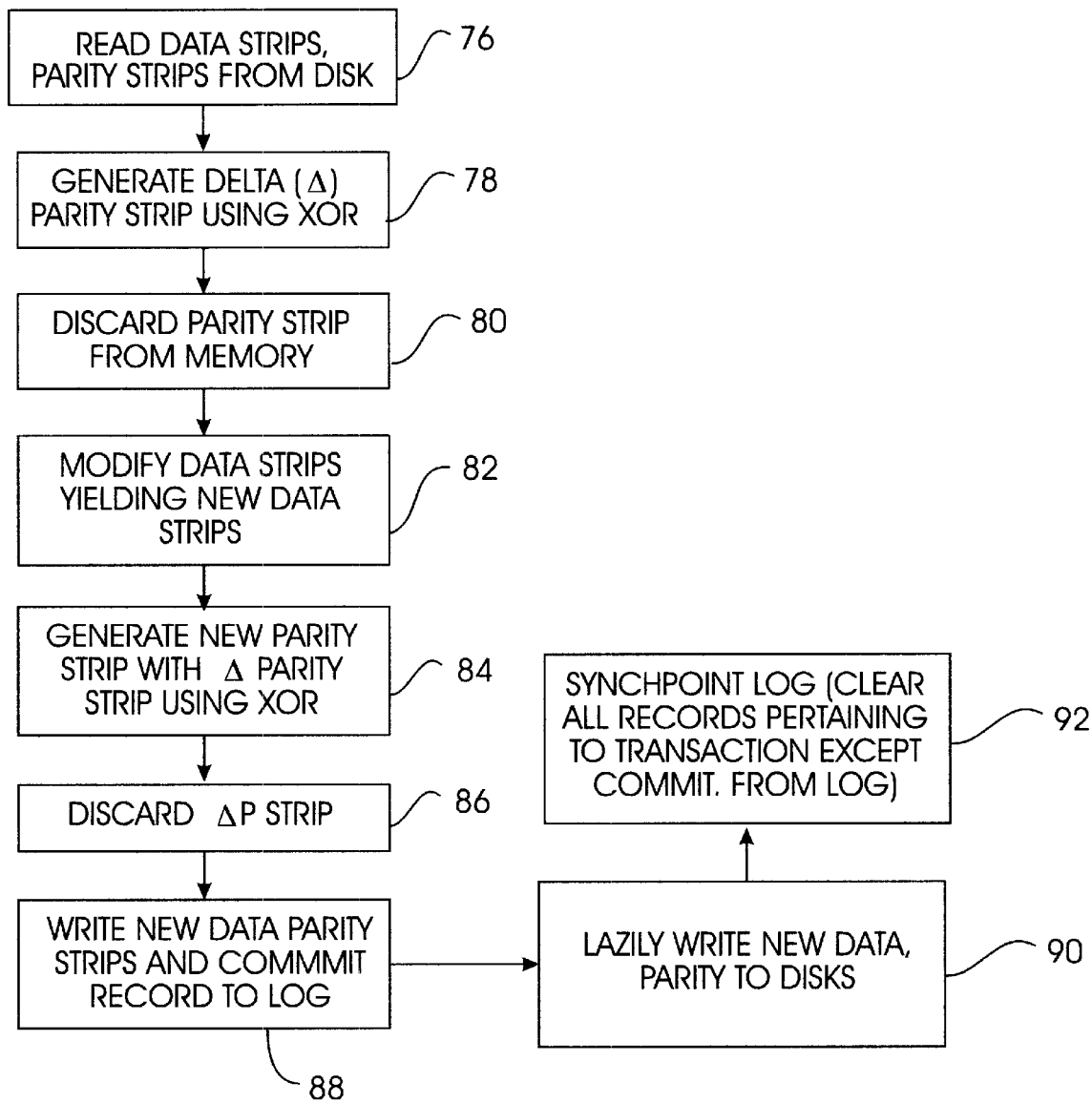
FIG. 6 is a flow chart of the logic undertaken when multiple strips of a stride are changed, in a non-worst case scenario.

FIG. 6 shows the logic that is followed when a multi-strip update to a stride, but not a complete stride update, is to be made under non-worst case conditions. Commencing at state 76, the existing data and parity strips of the stride to be updated are read from disk. Moving to state 78, a delta parity strip is generated by XORing the data strips and parity strip.

Proceeding to state 80, the old parity strip is discarded from memory, and then at state 82 the data strips to be modified are modified in memory with the update received at state 21 in FIG. 3 to render new strips. Next, having updated the data strips in memory, the logic moves to state 84 to generate a new parity strip by XORing the delta parity strip and the new data strips. At state 86, the delta parity strip is discarded from memory, and then at state 88 the new data strips and new parity strip are written to the log 18. Also, a commit record is written to the log 18. The commit record indicates that new data strips have been generated based on the update received at state 21 in FIG. 2, and that the new strips are available in memory.

Once the commit record, new parity strip, and new data strips have been written to the log 18, the logic lazily writes the new data and parity strips to the disk array 12 at state 90. The log 18 is then synchpointed at state 92.

Figure 7:
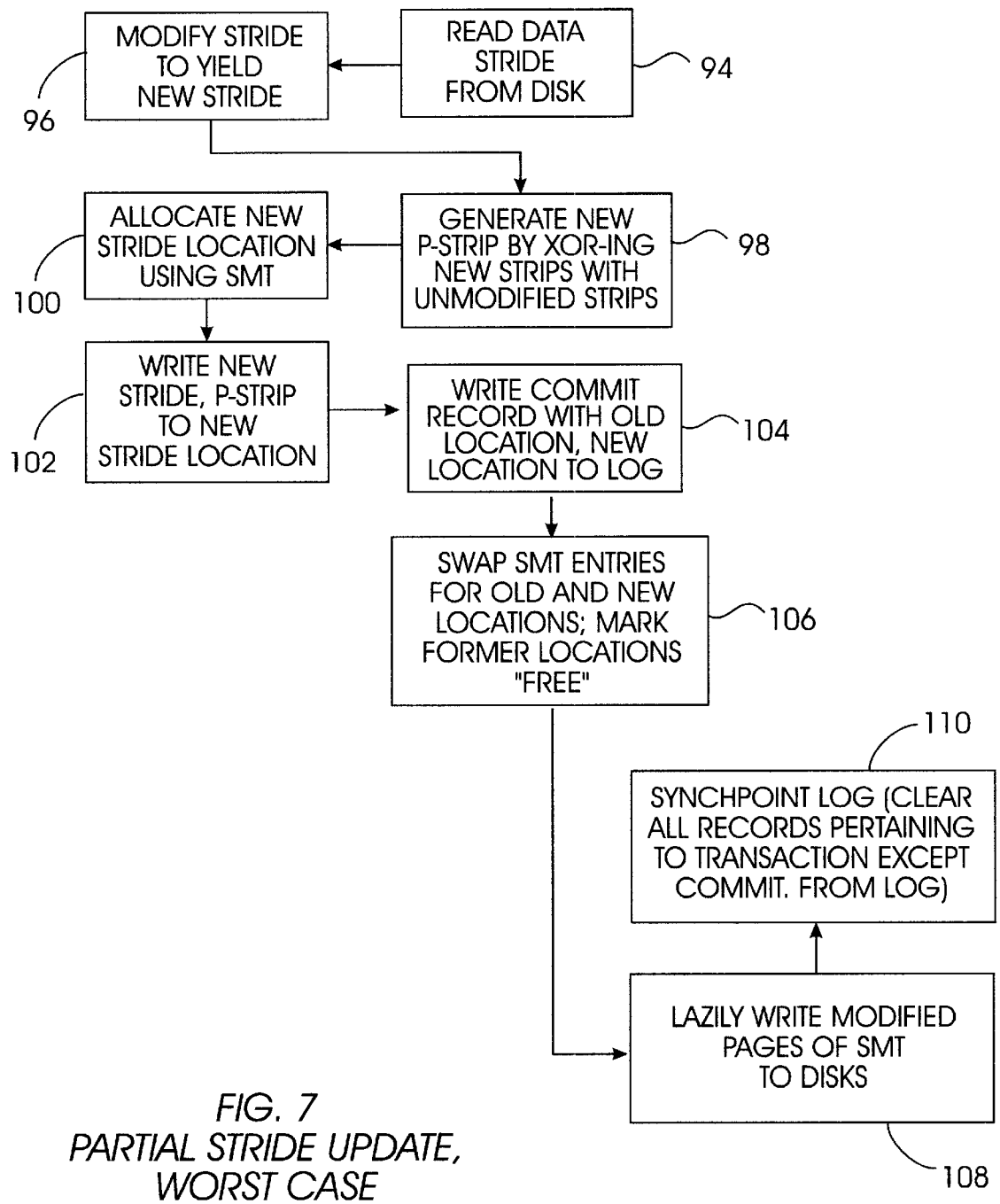
FIG. 7 is a flow chart of the logic undertaken when multiple strips of a stride are changed, in a worst case scenario.

FIG. 7 shows the logic that is undertaken when multiple strips but less than an entire stride is to be updated, under worst case conditions. Commencing at state 94, the stride to be updated is read from disk, and at state 96 the strips to be updated are modified using the update received at state 21 in FIG. 3, rendering new data strips. Proceeding to state 98 a new parity strip is generated by XORing the new strips with the remaining (unmodified) strips of the stride. The above operations are executed in memory.

The logic next moves to state 100 to access the SMT 20 to allocate a new physical location for the new stride. The new physical location is a previously unallocated portion of the disk array 12. Then, moving to state 102, the new stride, including the new (modified) strips and remaining unmodified strips, along with the parity strip, are written to the new physical location on the array 12.

Proceeding to state 104, a commit record of the modification, along with the addresses of the old stride physical location and new stride physical location, are written to the log 18. The process next moves to state 106 to exchange entries in the SMT 20 for the old and new physical locations, with the entry for the formerly old location being marked as "free" in the SMT 20. The logic of FIG. 7 concludes by lazily writing the modified page(s) of the SMT 20 to the array 12 at state 108, and then lazily synchpointing the log 18 at state 110.

With the above in mind, it will be appreciated that changes to data storage are logged only if such logging cannot meet the criteria for invoking the logic of FIGS. 5 and 7 in accordance with the above logic. This is accomplished by writing changes to logical storage to unallocated physical storage, and by writing changes to physical data structures to the log. Also, once the commit record has been written to the log 18, the in-memory copies of the data structures may be updated (e.g., by deleting them to free up memory) and the resources used by the transaction may be unlocked for use by other transactions. In this way, log traffic advantageously is minimized because changes to logical storage can be written to unallocated physical storage when it makes sense to do so, in accordance with the above-described flow charts, with the amount of data actually written to the log being IDE minimized. Moreover, recovery from a disk drive malfunction is simplified because partial writes of data to unallocated physical storage do not require recovery actions to reclaim the data and ensure a consistent state.

Figure 8:
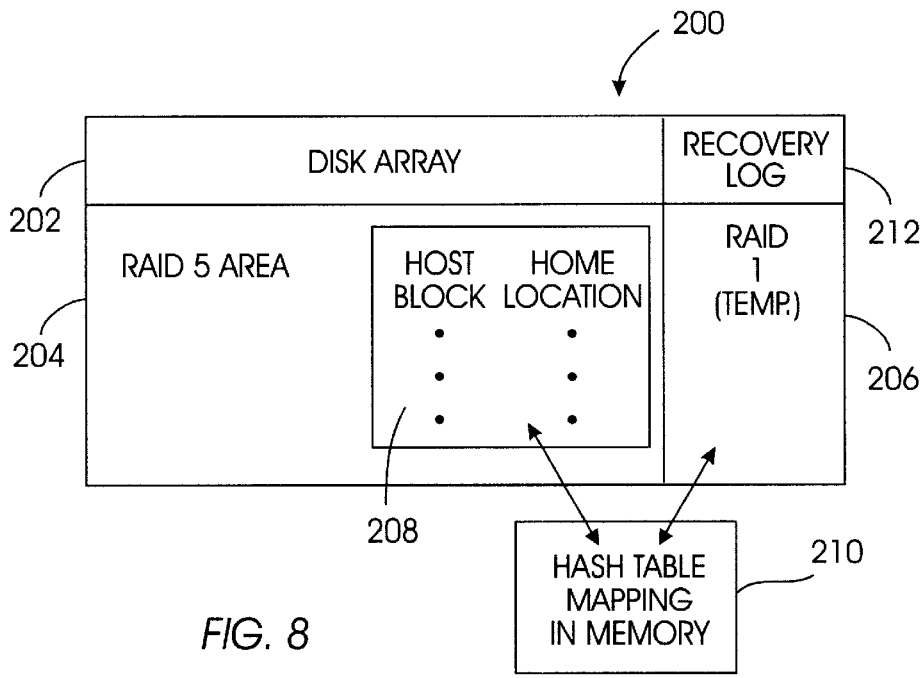
FIG. 8 is a schematic diagram of a second embodiment of the present system.

Now referring to FIG. 8, an alternate RAID storage system is shown, generally designated 200. As shown, the system 200 includes a disk array 202 having a RAID-5 area 204 and a RAID-1 area 206, it being understood that the present invention applies generally to non-volatile storage such as NVRAM. In accordance with the present invention, the RAID-5 area 204 includes home locations for host data blocks, as indicated by the table 208 schematically shown in FIG. 8.

An in-memory map 210 records block mappings to RAID-1 temporary locations. In a preferred embodiment, the map 210 is established by a hash table. Other maps can be used, however, including tree structures and linked lists. Furthermore, a log 212 of block home locations in the RAID-5 area and temporary locations in the RAID-1 area is stored on the disk array 202.

Figure 9:
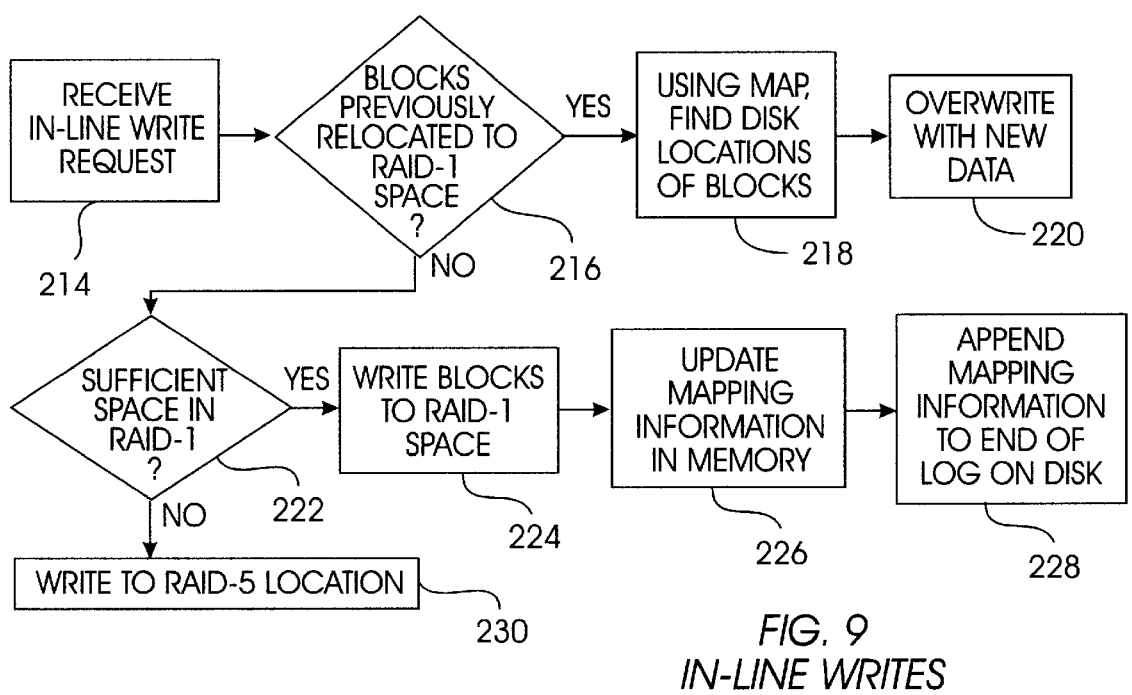
FIG. 9 is a flow chart of the logic for performing in-line writes of the second embodiment.

Now referring to FIG. 9, the logic for undertaking in-line writes to the system 200 is shown. As shown, an in-line write request is received at step 214. Proceeding to decision diamond 216, it is determined whether the blocks to which the write request pertains have been previously stored in the RAID-1 area. When the test at decision diamond 216 is positive, indicating that the write request is for modified blocks prior versions of which have been stored in the RAID-1 area, the logic moves to step 218 to access the map 210. Using the map (e.g., a hash table), the logic find the locations in the RAID-1 area of the requested blocks, and at step 220 overwrites those locations with the new data received at step 214. Advantageously, subsequent updates to the blocks can be accomplished in only two I/O operations.

On the other hand, when the blocks to be written have not had earlier versions written to the RAID-1 area (i.e., the test at decision diamond 216 is negative), the logic determines, at decision diamond 222, whether sufficient free space exists in the RAID-1 area to hold the requested blocks. If sufficient space exists, the blocks are mitten to the RAID-1 area at step 224, and then the map 210 in memory is updated accordingly at step 226. The mapping information that pertains to the newly written blocks is then appended to the disk log 212 at step 228. In contrast, if it is determined at decision diamond 222 that insufficient space exists in RAID-1 for the blocks, they are written to the RAID-5 area at step 230.

Figure 10:
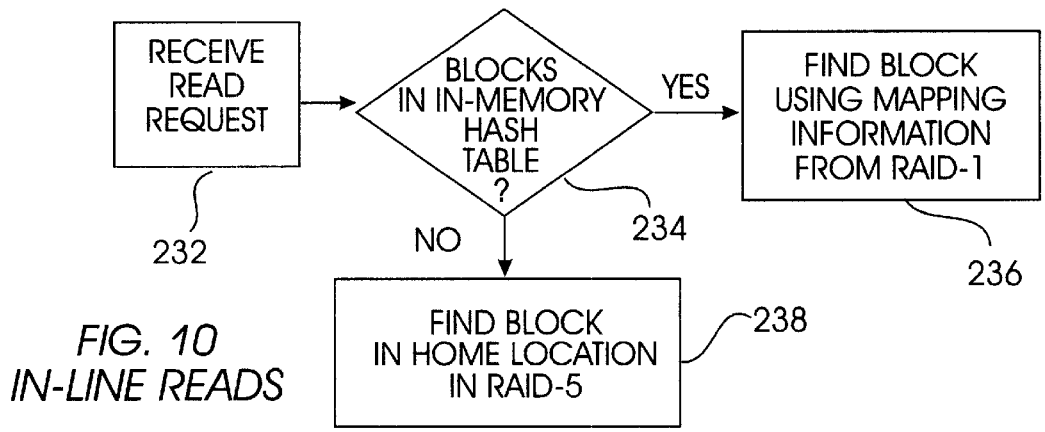
FIG. 10 is a flow chart of the logic for performing in-line reads.

FIG. 10 shows the logic undertaken for in-line read requests. A read request is received at step 232, and then at decision diamond 234 it is determined whether the blocks are listed in the in-memory map. If they are, the logic uses the map to locate the blocks in the RAID-1 area at step 236; otherwise, the logic finds the block in its home location in the RAID-5 area at step 238.

Figure 11:
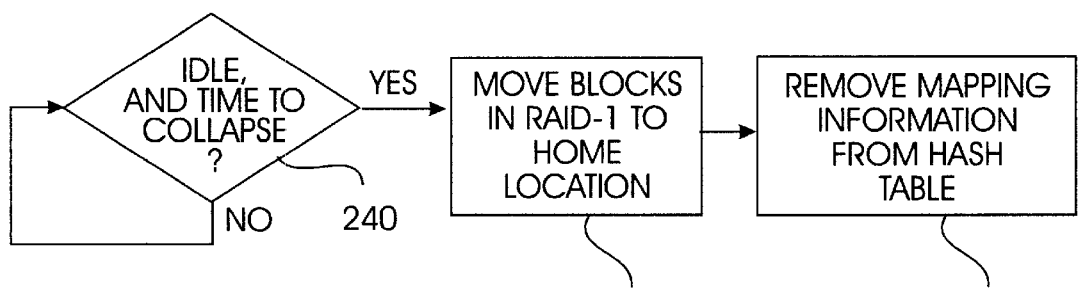
FIG. 11 is a flow chart of the logic for collapsing blocks from temporary locations in a RAID-1 area to home locations in a RAID-5 area.

As intended by the present invention, during system idle time or periodically, blocks are moved ("collapsed") from their temporary locations in the RAID-1 area to their home locations in the RAID-5 area. Accordingly, FIG. 11 shows, at decision diamond 240, that when the system is idle and the period between collapse operations has elapsed, the logic proceeds to step 242 to move the blocks from their temporary locations to their home locations. Then, at step 244 the mapping information pertaining to the moved blocks is removed from the in-memory map 210, so that subsequent reads will read the data from the home locations in the RAID-5 area. Subsequent writes on collapsed disk blocks again bring out the blocks to their temporary locations in the RAID-1 area. One block at a time is processed using the logic of FIG. 11, until the amount of free space reaches a predetermined level.

Figure 12:
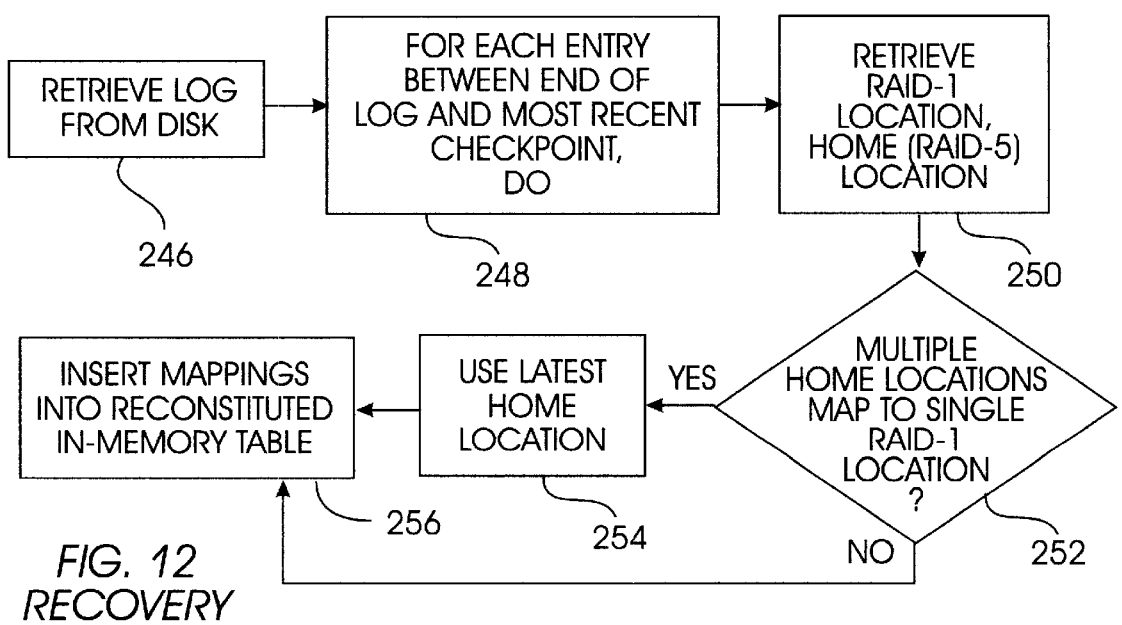
FIG. 12 is a flow chart of the recovery logic of the alternate embodiment.

FIG. 12 shows the steps that are taken to recover after a controller crash. To ensure that the disk log 212 does not become infinitely long, the log 212 is periodically synchronized with the map 210 in memory by checkpointing the entire map 210 (e.g., by checkpointing a mapping hash table). "Checkpointing" means appending all the information in the in-memory map 210 to the on-disk log 212. The synchronization can be done during idle time or at fixed intervals. After the hash table is checkpointed, the portions of the log 212 prior to the checkpoint can be recycled, i.e., overwritten for reuse. In this way excessive "garbage collection" is avoided.

With this in mind, at step 246 in FIG. 12, after a crash the log 212 is retrieved from the disk array. At step 248 a DO loop is entered for each log entry between the end of the log 212 and the most recent checkpoint. Proceeding to step 250, the RAID-1 temporary location and RAID-5 home location for the entry is obtained from the log 212, and at decision diamond 252 it is determined whether multiple home locations map to a single RAID-1 temporary location. If so, the latest home location is used at step 254. From step 254, or from decision diamond 252 if only one home locations maps to the temporary location, the logic proceeds to step 256 to insert the temporary location block mappings into a reconstituted in-memory map 210, such as a hash table.

When extra memory is available in the system 200 controller, RAID-0 optimization can be used in which, for small writes, only half of a RAID-1 stripe (i.e., a RAID-0 stripe) is written to RAID-5, and half is retained in memory. In this way, each small in-line write incurs only a single I/O, and the data is still protected. The second half of the RAID-1 stripe is flushed to disk when short of memory space.

A log-structured RAID-1 optimization can be used in which the RAID-1 area 206 shown in FIG. 8 can be regarded as a log. Each newly relocated disk block and its corresponding mapping information would then be appended to the "log" established by the RAID-1 area, such that each relocation write can be executed with two I/O operations instead of three. Because this is an inexpensive approach, it can be appropriate for low-end systems.

In addition, when the system 200 controller has sufficient space for writes, a non-volatile memory (NVM) optimization can be used wherein many mapping information updates to the disk log 212 are bundled into a single large write. Also, multiple small writes can be bundled in NVM and written out to the RAID-1 temporary locations when NVM is full. Moreover, RAID-5 stripes, instead of RAID-1 stripes, can be used for these bundled small writes.

The above principles can be applied to file systems, as well as disk array systems, to strike an optimum balance between a fast file system (FFS), which optimizes reads, and a log-structured file system (LFS), which optimizes writes. More specifically, to allow fast writes without destroying the file layouts determined by FFS, each file block is associated with a home location, which is the file block address determined by the file system when the block is first allocated. Log-structured writes are then used for subsequent updates to blocks in the respective home locations. The updates can be merged into home locations during system idle time or when free space in the file system is low. In this way, both reads and writes can be optimized without extensive "garbage collection".

While the particular HIGH RELIABILITY, HIGH PERFORMANCE DISK ARRAY STORAGE SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A general purpose computer including at least one memory and at least one computer usable medium having computer usable code means for storing data on at least one data storage device having at least one old data set stored thereon, the computer usable code means including:

computer readable code means for receiving an update of at least a portion of the old data set;

computer readable code means for modifying, in memory, the old data set using the update, to render a modification;

computer readable code means for writing at least a record of the modification to a log; and computer readable code means for writing at least a portion of the modification to the data storage device, wherein the portion of the old data is at least plural old strips of a stride, the update is at least plural new strips, the computer readable code means for writing the modification to the data storage device writes the modification to a new physical location on the data storage device that is different from the physical location of the old data set, and the computer usable code means includes:

computer readable code means for generating at least one new parity strip using at least the new strips, wherein the means for writing the record to the log also writes at least an address of the new physical location and an address of the physical location of the old data set to the log, without writing the modification and the new parity strip to the log.

2. The computer of claim 1, wherein the data storage device includes at least one disk array on which data is stored in strides, the strides establishing respective data sets, each stride defining plural strips, the data storage device being used as a block service.

3. The computer of claim 2, wherein the portion of the old data is at least one old strip and the update is at least one new strip, and the computer usable code means includes:

computer readable code means for generating at least one delta parity strip using the old strip and an old parity strip; and computer readable code means for generating a new parity strip using the delta parity strip and the modification, wherein the means for writing the record to the log also writes at least the modification and the new parity strip to the log.

4. The computer of claim 3, wherein the means for writing the modification to the data storage device also writes the new parity strip to the data storage device, the modification being written to the physical location of the old data set.

5. The computer of claim 3, wherein the computer readable code means for generating use an XOR operator.

6. The computer of claim 3, further comprising computer readable code means for discarding from the log the parity strips and the modification, after the parity strips and the modification have been written to the data storage device.

7. The computer of claim 1, wherein the new physical location is determined using a stride mapping table.

8. The computer of claim 1, further comprising a stride mapping table including respective entries for the new physical location and the physical location of the old data set, and the computer further comprises computer readable code means for exchanging the entries in the table for each other.

9. The computer of claim 1, wherein the computer readable code means for generating use an XOR operator.

10. The computer of claim 1, further comprising computer readable code means for discarding from the log the addresses of the physical locations, after the modification has been written to the data storage device.

11. For a block service disk array across which data is arranged in strides, each stride defining a respective strip on a respective disk of the array, a computer-implemented method including acts to logically write all changes to strides while physically writing ahead to a log only a subset of the changes, wherein the disk array has at least one old stride stored thereon, and the method further includes:

receiving an update of at least a portion of the stride;

modifying the old stride using the update to render a modification;

writing at least a commit record of the modification to a log;

writing at least a portion of the modification to the disk array;

wherein the portion of the old stride is at least plural old strips of the stride, the update is at least plural new strips, and the acts further include:

generating at least one new parity strip using at least the new strips;

writing at least an address of the new physical location and an address of the physical location of the old stride to the log, without writing the modification and the new parity strip to the log.

12. The method of claim 11, wherein the disk array has at least one old stride stored thereon, and the method includes receiving an update of at least a portion of the stride, and modifying the old stride using the update to render a modification.

13. The method of claim 12, further comprising the acts of:
   writing at least a commit record of the modification to a log; and
   writing at least a portion of the modification to the disk array.

14. The method of claim 13, wherein the portion of the old data is at least one old strip and the update is at least one new strip, and the acts further include:
   generating at least one delta parity strip using the old strip and an old parity strip; and
   generating a new parity strip using the delta parity strip and the modification, wherein the modification and the new parity strip are written to the log.

15. The method of claim 14, wherein the new parity strip is written to the disk array and the modification is written to the physical location of the old stride.

16. The method of claim 14, wherein the delta parity strip is generated using an XOR operator.

17. The method of claim 15, further comprising the act of discarding from the log the parity strips and the modification, after the parity strips and the modification have been written to the disk array.

18. The method of claim 13, wherein the modification is written to the disk array to a new physical location that is different from the physical location of the old stride.

19. The method of claim 18, wherein the new physical location is determined using a stride mapping table.

20. The method of claim 19, wherein the portion of the old stride is at least plural old strips of the stride, the update is at least plural new strips, and the acts further include:
   generating at least one new parity strip using at least the new strips;
   writing at least an address of the new physical location and an address of the physical location of the old stride to the log, without writing the modification and the new parity strip to the log.

21. The method of claim 13, further comprising the act of exchanging stride mapping table entries for the new physical location and the location of the old stride for each other.

22. The method of claim 21, further comprising the act of discarding from the log the addresses of the physical locations, after the modification has been written to the disk array.

23. A computer program device comprising:
   a computer program storage device readable by a digital processing apparatus; and
   a program on the program storage device and including instructions executable by the digital processing apparatus for performing method acts for storing data on a data storage device, the method acts comprising:
      receiving an update of at least a portion of an existing stride of data stored on a block service disk array;
      determining whether to write just the update to disk or to write a modified version of the entire stride to disk;
      if the modified version of the entire stride is to be written to disk, determining a new location to which the modified version of the stride is to be written, the new location being different from an old location at which the existing stride is stored; and
      writing a commit record of the modification to a log along with at least the new location, when the modified version of the entire stride is to be or has been written to disk, and otherwise writing a commit record of the modification to a log along with at least the update, when just the update is to be written to disk.

24. The computer program product of claim 23, wherein the method acts further comprise exchanging entries in a stride mapping table for the new and old locations, when the modified version of the entire stride is to be or has been written to disk.

25. The computer program product of claim 24, wherein the portion of the existing stride is at least one old strip and the update is at least one new strip, and wherein when just the update is to be written to disk, the acts further include:
   generating at least one delta parity strip using the old strip and an old parity strip; and
   generating a new parity strip using the delta parity strip and the update, wherein the update and the new parity strip are written to the log.

26. The computer program product of claim 25, wherein the new parity strip is written to the disk array and the update is written to the physical location of the old stride.

27. The computer program product of claim 26, wherein the delta parity strip is generated using an XOR operator.

28. The computer program product of claim 26, wherein the method acts further comprise discarding from the lot the parity strips and the update, after the parity strips and the update have been written to the disk array.

29. The computer program product of claim 24, wherein the portion of the existing stride is plural old strips and the update is plural new strips, and when the modified version of the entire stride is to be or has been written to disk, the new location is determined using the stride mapping table.

30. The computer program product of claim 29, wherein the method acts further include:
   generating at least one new parity strip using at least the new strips;
   writing at least an address of the new location and an address of the location of the existing stride to the log, without writing the stride and the new parity strip to the log.

31. The computer program product of claim 30, wherein the method acts further comprise discarding from the log the addresses of the physical locations, after the stride has been written to the disk array.

* * * * *